(12) United States Patent
Otsuka et al.

(10) Patent No.: US 6,571,108 B1
(45) Date of Patent: May 27, 2003

(54) PRIVATE BRANCH MOBILE COMMUNICATION SYSTEM AND METHOD

(75) Inventors: Kiyokazu Otsuka, Tokyo (JP); Minako Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,835

(22) Filed: May 28, 1999

(30) Foreign Application Priority Data

May 29, 1998 (JP) ............................................. 10-150278

(51) Int. Cl.⁷ .............................. H04M 1/00; H04B 1/38
(52) U.S. Cl. ...................... 455/555; 455/554; 455/435; 455/463; 379/225
(58) Field of Search ................................ 455/435, 463, 455/555, 426, 432, 436, 450, 462, 554, 464, 433; 379/198, 221.09, 225, 231, 232, 234

(56) References Cited

U.S. PATENT DOCUMENTS

| | | | |
|---|---|---|---|
| 5,438,608 A | * 8/1995 | Kojima | 455/411 |
| 5,479,483 A | * 12/1995 | Furuya et al. | 455/433 |
| 6,018,666 A | * 1/2000 | Chavez, Jr. | 455/435 |
| 6,122,518 A | * 9/2000 | Suda | 455/450 |
| 6,366,773 B1 | * 4/2002 | Ihara et al. | 455/419 |

FOREIGN PATENT DOCUMENTS

| | | |
|---|---|---|
| CA | 2153859 | 1/1996 |
| DE | 19618531 | 10/1997 |
| JP | 9-247741 | 9/1997 |
| JP | 10-70765 | 3/1998 |

* cited by examiner

*Primary Examiner*—Nguyen T. Vo
*Assistant Examiner*—Edan Orgad
(74) *Attorney, Agent, or Firm*—Foley & Lardner

(57) ABSTRACT

The invention provides a private branch mobile communication apparatus and method which allows hand-over without interruption of communication and makes it possible to allow a service from a private branch exchange of a home node to be utilized as it is even if a radio terminal moves from the private branch exchange of the home node to another private branch exchange. A network common database, a local database and a memory section are stored in each of private branch exchanges. When a radio terminal forwards a position registration request to a radio base station belonging to a second private branch exchange other than the home node to the radio terminal, the second private branch exchange refers to the network common database to access the local database and the memory section of the private branch exchange of the home node, and then refers to the network common database to perform position registration into the private branch exchange of the home node and extract service data of an additional service to be performed by the private branch exchange which has received the position registration request other than the home node.

8 Claims, 11 Drawing Sheets

PRIVATE BRANCH MOBILE COMMUNICATION SYSTEM AND METHOD

BACKGROUND OF THE INVENTION

1. Field of the Invention

The present invention relates to a private branch mobile communication system, and more particularly to a private branch mobile communication system for a local area switched network which includes a plurality of private branch exchanges (PBXs) installed over a wide area and allows origination and termination of a call also when a radio terminal which belongs to a certain home PBX is used in a radio area managed by another PBX which is physically different from the home PBX and a private branch mobile communication method for the private branch mobile communication system.

2. Description of the Related Art

In recent years, in response to a demand for increase in area, variety and so forth of information exchange in an enterprise, for example, construction of a local area switched network wherein a plurality of PBXs are interconnected by a trunk line to allow private branch telephone exchange over a wide area as well as introduction of a private branch and public mobile communication system called PHS (Personal Handyphone System) for a place of business and public wherein radio base stations are connected to each PBX and radio terminals are accommodated in each radio base station are being popularized.

In such a private branch mobile communication system as described above, a plurality of radio base stations are distributed in a local area of an enterprise and radio terminals present in radio areas of the radio base stations are connected to PBXs through the radio base stations to allow extension communication in the same PBX, extension communication with a terminal in another area over a local area switched network through a dedicated line and line wire communication over a public network connected by a main wire.

In the conventional private branch mobile communication system described above, in order to allow a radio terminal which belongs to a PBX in a certain region to be used in a radio area managed by a PBX of another region, PBX roaming processing must be performed. This is because a system ID (SYS-ID) which is a system call sign provided in order to establish matching between a radio terminal and a system which provides a mobile communication service to the radio terminal is different among different PBXs and because, according to the specifications of the conventional private branch mobile communication system, even if a common communication protocol is used between a radio base station and a radio terminal, the radio terminal and the radio base station which have different SYS-IDs from each other cannot communicate with each other. This is equivalent to the fact that, in mobile communication services of public networks, a radio base station and a radio terminal whose undertakers are different from each other cannot communicate with each other.

In this manner, since a conventional PBX cannot control radio terminals other than radio terminals whose attribute information such as operation and management information is registered in the PBX itself, in order to identify those radio terminals, a SYS-ID is provided, and mobile communication is allowed only between a radio terminal and a radio base station who have the same SYS-ID. Accordingly, even in a private branch network in the same enterprise, SYS-IDs different from each other are provided to different PBXs which form the network.

Roaming processing proceeds in the following manner. When power supply to a certain radio terminal is made available in a radio area managed by a PBX (called visitor PBX) different from a PBX (called home PBX) in which attribute information of the radio terminal is registered, it receives a SYS-ID provided to the visitor PBX and being announced from a radio base station connected to the visitor PBX. If the radio station discriminates that the SYS-ID announced is different from that of the home PBX, then it changes over the SYS-ID to that one of the other SYS-IDs registered in advance for roaming which is same as the SYS-ID announced at present and then issues a position registration request. The visitor PBX receives the position registration request through the radio base station and discriminates the home PBX from the identification number of the radio terminal, and requests the home PBX for a registered attribute of the radio terminal and transfers the position registration information. The visitor PBX receives the registered attribute of the radio terminal from the home PBX and performs call control regarding the radio terminal as a temporary registered subscriber of the visitor PBX.

A technique which allows, in a private branch mobile communication system wherein a plurality of PBXs which form a local area switched network perform attribute registration of radio terminals independently of each other, appropriate roaming to be always performed including also information between tenants in such a case that one PBX accommodates a plurality of enterprises is disclosed in Japanese Patent Laid-Open No. Hei 9-247741.

However, where conventional PBXs are employed, management and operation information necessary for exchanging processing such as an extension number is subject to closed management in each PBX, and communication between the PBXs has such a form that control is performed through communication of limited information through a trunk line which interconnects the PBXs. Therefore, for connection between extension terminals accommodated in PBXs physically different from each other, call control processing must be performed separately on the transmission side and the reception side and also the exchanged information amount between the PBXs is limited. Consequently, employment of PBXs has a problem in that, when compared with a single PBX, service functions are limited significantly.

This similarly applies to operation of radio terminals accommodated in a private branch mobile communication system which is formed from radio base stations connected to such conventional PBXs. In particular, since management and operation information necessary for exchanging processing undergoes closed management in each PBX, the same SYS-ID cannot be provided to different PBXs. Consequently, use of a radio terminal is limited to the area of radio waves of radio base stations connected to a particular PBX in which attribute information of the radio terminal is registered for management and operation. And, in order to operate the radio terminal in the area of radio waves of a radio base station connected to a visitor PBX different from the home PBX in which the radio terminal is registered, roaming processing wherein the visitor PBX acquires operation data from the home PBX in which the radio terminal is registered and temporarily registers the radio terminal is required. In this manner, service functions are limited significantly. Also the hardware of the radio terminal must be constructed for roaming.

In particular, even if a private branch mobile communication system is constructed over a wide area using conventional PBXs, operation of each individual radio terminal is restricted significantly by a home PBX in which the radio terminal is registered. Consequently, and there is a problem that, while each radio terminal has portability as a radio terminal, it cannot sufficiently enjoy the benefit.

Further, even if a radio terminal moves between adjacent radio areas, if different SYS-IDs are used for the radio areas, then roaming processing must be performed, and there is a problem that a call in service is temporarily interrupted for such switching. Accordingly, even with a private branch mobile communication system wherein successive radio areas are formed over a wide area, where the radio areas are managed by individually different PBXs, roaming processing is performed upon movement a radio terminal between radio areas, and consequently, it is impossible to realize hand-over by which communication is continued between different radio areas.

SUMMARY OF THE INVENTION

It is an object of the present invention to provide a private branch mobile communication system and a private branch mobile communication method wherein, even where a local area switched network is formed from a plurality of PBXs and the individual PBXs manage attribute information of radio terminals independently of each other, a radio terminal used in a home PBX can perform, also in a radio area managed by a different PBX, continuation of communication or origination or termination of a call freely without performing roaming processing.

In order to attain the object described above, according to an aspect of the present invention, there is provided a private branch mobile communication system, comprising a distributed node switched network including a plurality of private branch exchanges each of which accommodates one or more radio base stations and has an identifiable node number provided thereto, and one or more radio terminals, a common system ID which defines a range of use over the distributed node switched network being allocated to the radio terminals, private branch exchanges and radio base stations, a network common database provided in each of the private branch exchanges and common for the radio terminals which have the system ID, and a private branch exchange individual database provided in each of the private branch exchanges for recording basic data of any of the radio terminals into the private branch exchange so that the private branch exchange may serve as a home node to the radio terminal, and means provided in each of the private branch exchanges for referring to the network common database to convert an ID from a radio terminal into a node number and a physical accommodation position provided by the private branch exchange of the home node to the radio terminal.

The private branch mobile communication system may further comprise a subscriber control section provided in each of the private branch exchanges for controlling communication with any of the radio base stations which belongs to the private branch exchange and performing fetching and forwarding of various events, a call control section provided in each of the private branch exchanges for discriminating which one of the private branch exchanges serves as a home node to that one of the radio terminals which has forwarded a position registration event by accessing the network common database of the private branch exchange itself and converting a unique ID of the radio terminal into a node number and a physical accommodation position, and a control signal transfer section provided in each of the private branch exchanges for transferring a control signal for rewriting the private branch exchange individual database of the private branch exchange of the home node in response to an instruction of the call control section.

The private branch mobile communication system may form a personal handyphone system.

According to another aspect of the present invention, there is provided a private branch mobile communication method, comprising the steps of forming a distributed node switched network from a plurality of private branch exchanges each of which accommodates one or more radio base stations and has an identifiable node number provided thereto, and one or more radio terminals, allocating a common system ID (SYS-ID) which defines a range of use over the distributed node switched network to the radio terminals, private branch exchanges and radio base stations, storing, into each of the private branch exchanges, a network common database common for the radio terminals which have the system ID and a private branch exchange individual database for recording basic data of any of the radio terminals into the private branch exchange so that the private branch exchange may serve as a home node to the radio terminal, determining, when any of the radio terminals which has the common system ID forwards a position registration request to one of the radio base stations which belongs to one of the private branch exchanges other than the home node to the radio terminal itself, by the private branch exchange to which the position registration request has been forwarded, an ID unique in the network of the radio terminal from the network common database and communicating, based on the ID unique in the network determined from the network common database and the node number, the position registration request of the radio terminal to the private branch exchange of the home node designated by the node number, and updating, by the private branch exchange of the home node, the position registration information of the private branch exchange individual database regarding the radio terminal.

With the private branch mobile communication system and method, even if a radio terminal which is communicating moves from a private branch exchange of a home node to the radio terminal itself to another private branch exchange, hand-over is possible without interrupting the communication, and origination or termination of a call can be performed freely through a plurality of private branch exchanges including the private branch exchange of the home node.

When the radio terminal performs a busy transfer request, data for busy transfer may be read out from the private branch exchange individual database of the private exchange of the home node to the radio terminal, and a communication path may be established between the radio terminal and an extension terminal of a destination of the transfer through the private branch exchanges. With the private branch mobile communication method, even if a radio terminal moves from a private branch exchange of a home node to the radio terminal itself to another private branch exchange, busy transfer is possible.

According to a further aspect of the present invention, there is provided a private branch mobile communication method, comprising the steps of forming a distributed node switched network from a plurality of private branch exchanges each of which accommodates one or more radio base stations, and one or more radio terminals, allocating a common system ID which defines a range of use over the distributed node switched network to the radio terminals, private branch exchanges and radio base stations, storing, into each of the private branch exchanges, a network common database common for the radio terminals which have the system ID and a private branch exchange individual database for recording basic data of any of the radio terminals into the private branch exchange so that the private branch exchange may serve as a home node to the radio terminal, and referring, when any of the radio terminals which has the common system ID performs a position registration event into one of the radio base stations which belongs to a second one of the private branch exchanges other than the home node to the radio terminal, by the second private branch exchange, to the network common database to access the private branch exchange individual database of the private branch exchange of the home node to perform position registration and reading out service data regarding the radio terminal stored in the private branch exchange individual data base of the home node, and then performing an additional service by the second private branch exchange.

With the private radio mobile communication method, even if a radio terminal is waiting at any physically different private branch exchange, communication is allowed with the private branch exchange of the home node, and there is an advantage that the radio terminal can always enjoy a service as an extension terminal of the private branch exchange of the home node.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
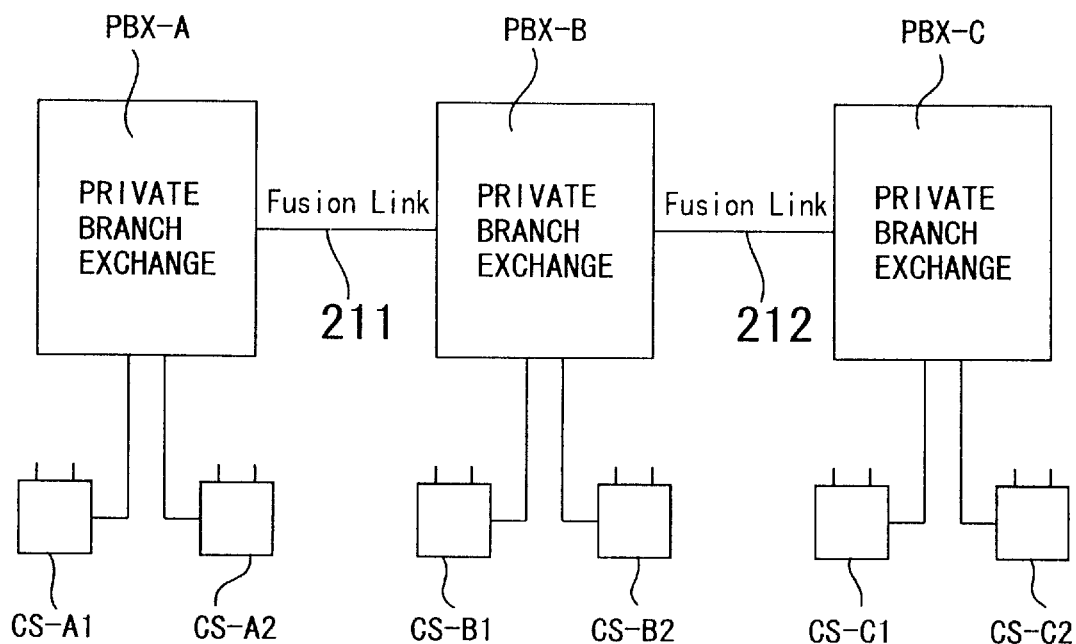
FIG. 1 is a block diagram of a system to which a private branch mobile communication method of the present invention is applied.

Referring first to FIG. 1, there is shown a system to which a private branch mobile communication method of the present invention is applied. The system shown includes a private branch exchange PBX-A, another private branch exchange PBX-B and a further private branch exchange PBX-C each of which accommodates radio base stations. The private branch exchanges PBX-A, PBX-B and PBX-C are connected to each other by digital private lines (fusion links) 211 and 212 such that they form a fusion network based on distribute node switched network call control so that they mutually refer to information in the other PBXs freely over the digital private lines 211 and 212 and control a communication path on the fusion links. In this Fusion-Network each PBX act as one PBX.

Here, a construction of the Fusion-Network based on distributed node switched network call control and handling of management information are described taking a PBX construction of the wire type as an example.

The fusion network based on distributed node switched network call control provides, to individual pieces of physical accommodation position information of resources whose operation is to be controlled actually as exchanging processing such as switch accommodation positions of a plurality of PBXs (nodes) which form the distributed node exchange network, logical accommodation position information which is specified uniquely in the distributed node switched network, manages call control with the physical accommodation position information and connects the nodes by a LAN line, a high-speed digital private line or the like so that required data incidental to control of a call are exchanged between each other such that, for one call, a call control processing apparatus of a suitable one of the nodes manages pertaining modules of the other PBXs which relate to the call in a centralized fashion.

Figure 2:
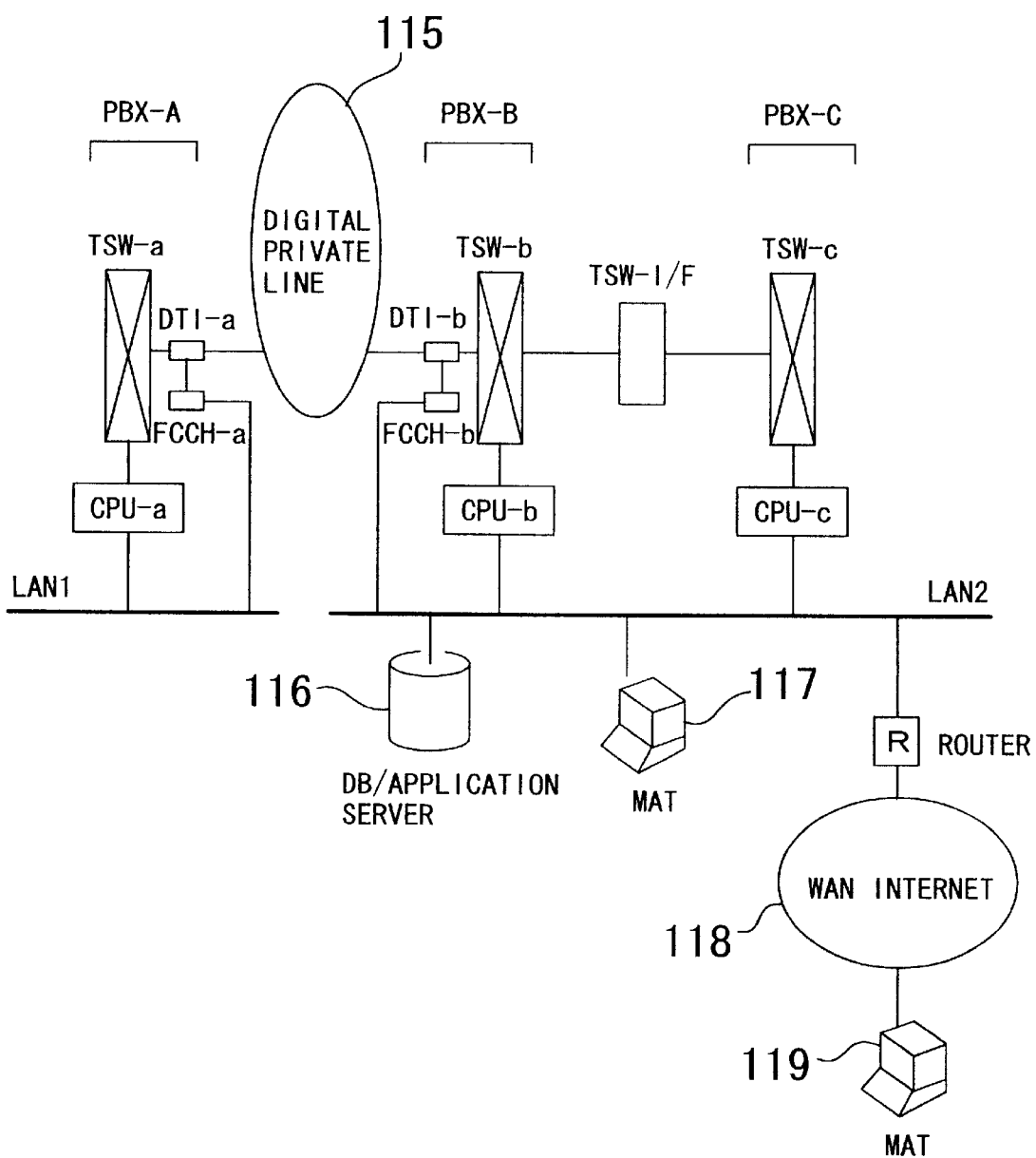
FIG. 2 is a block diagram showing a distributed node switched network which is incorporated in a private branch mobile communication system of the present invention.

FIG. 2 is a block diagram showing an example of a construction of the fusion network based on distributed node switched network call control. Referring to FIG. 2, the fusion network includes three private branch exchanges PBX-A, PBX-B and PBX-C. The private branch exchanges PBX-A, PBX-B and PBX-C include channel switches TSW-a, TSW-b and TSW-c and processors CPU-a, CPU-b and CPU-c, respectively. The channel switches TSW-b and TSW-c are connected to each other by a dedicated channel switch interface TSW-I/F while the channel switches TSW-a and TSW-a are connected to each other by a digital private line 115 through digital trunk interfaces DTI-a and DTI-b, respectively.

The processors CPU-a, CPU-b and CPU-c communicate call control information, system control information, maintenance operation information and so forth for communication between the nodes through local area networks LAN1 and LAN2. Required information of the local area networks LAN1 and LAN2 is communicated through fusion call control handling apparatus FCCH-a and FCCH-b, respectively, while it is multiplexed in the digital private line 115 together with a trunk line between the digital trunk interfaces DTI-a and DTI-b.

Further, in the fusion network of FIG. 2, a database (DB)/application server 116 is connected to the local area network LAN2 and cooperates with the processors CPU-a, CPU-b and CPU-c to develop various service functions. Further, terminal equipments MAT 117 and MAT 119 for supervision of maintenance operation of the distributed PBXs are connected to the local area network LAN2 directly or through a wide area network such as the Internet which is connected through a router R.

Figure 3:
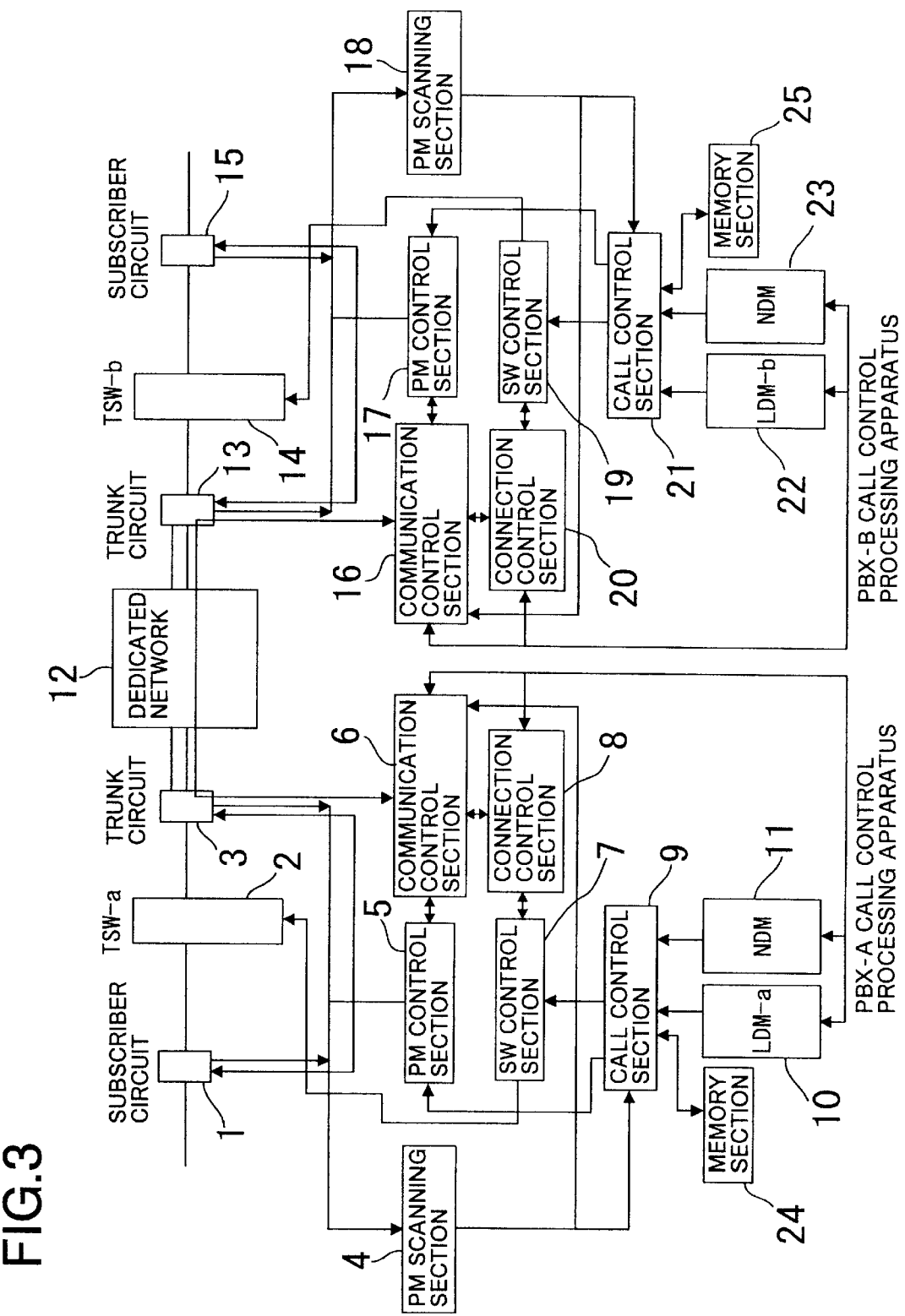
FIG. 3 is a block diagram showing a functional construction for performing call control processing in the distributed node switched network of FIG. 3.

FIG. 3 is a block diagram showing a channel system including a channel switch and an internal construction regarding call control processing of the processor shown in FIG. 2 which is implemented by call processing software and so forth, and in FIG. 3, a construction regarding the processors CPU-a and CPU-b of the private branch exchanges PBX-A and PBX-B is illustrated.

The call control processing apparatus of each of the private branch exchanges PBX-A and PBX-B includes a peripheral module (PM) scanning section 4 or 18 which supervises input/output peripheral apparatus such as a subscriber circuit 1 or 15 and a trunk circuit 3 or 13 which are connected to the channel switch TSW-a or TSW-b, a peripheral module (PM) control section 5 or 17 for controlling the input/output peripheral apparatus such as the subscriber circuit 1 or 15 and the trunk circuit 3 or 13, a switch (SW) control section 7 or 19 for controlling the channel switch TSW-a or TSW-b, a call control section 9 or 21 for performing call control through the peripheral module control section 5 or 17 and the switch control section 7 or 19, a communication control section 6 or 16 for controlling communication with any other node, a connection control section 8 or 20 for managing connection between PBXs, a local data memory LDM-a 10 or LDM-b 22 which stores information unique to the individual node and is referred to by the call control section 9 or 21, a network common data memory NDM 11 or 23 which stores information common to all of the nodes which form the distributed node switched network and is referred to by the call control section 9 or 21, and a memory section 24 or 25 used by the call control section 9 or 21.

As described above, in a distributed node switched network, resources regarding call control are managed with particular logical accommodation position information of individual nodes in the distributed node switched network together with physical accommodation position information of the individual nodes. Therefore, the call control processing apparatus of each node includes, in addition to the construction of FIG. 3, a conversion section 31 (FIG. 4) which is referred to by the peripheral module scanning section 4 or 18, peripheral module control section 5 or 17, switch control section 7 or 19, communication control section 6 or 16, and connection control section 8 or 20.

Figure 4:
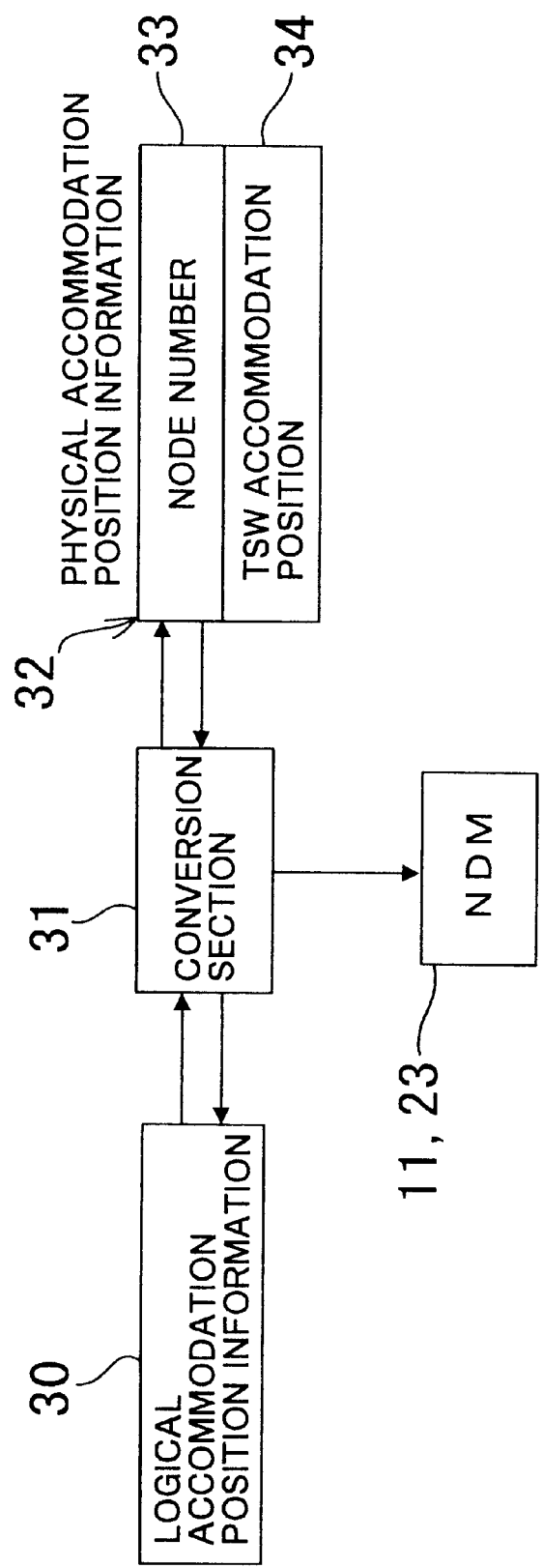
FIG. 4 is a block diagram showing a function of a conversion section for conversion between logical accommodation position information and physical accommodation position information in the distributed node switched network of FIG. 2.

FIG. 4 is a block diagram illustrating a function of the conversion section 31. Referring to FIG. 4, the conversion section 31 refers to the network common data memory NDM 11 or 23 to effect mutual conversion between logical accommodation position information 30 and physical accommodation position information 32 which includes a node number 33 and a channel switch (TSW) accommodation position 34.

Further, when call control involves a plurality of nodes by control of the connection control section 8 or 20, in order to prevent competition of controls, the call control processing apparatus of each node includes an event transfer management memory which is managed by the connection control section 8 or 20 and indicates the node of the transfer destination call control section 9 or 21 to which an event occurring in each step of call control regarding the logical accommodation position of the same is to be transferred, and is referred to by the peripheral module scanning section 4 or 18, peripheral module control section 5 or 17, switch control section 7 or 19 and communication control section 6 or 16. It is to be noted that, in an initial state, the event transfer destination node number of the event transfer management memory indicates the number of a node in which the logical accommodation position is accommodated.

The distributed node switched network has such a construction as described above, and, for example, if call origination processing of the subscriber circuit 1 of the private branch exchange PBX-A is detected by the peripheral module scanning section 4, then the peripheral module scanning section 4 converts the physical accommodation position information of the subscriber circuit 1 into logical accommodation position information by means of the conversion section 31 thereof and announces the logical accommodation position information to the call control section 9 of the self node (private branch exchange PBX-A) now indicated by the event transfer management memory. The call control section 9 refers to the network common data memory NDM 11 to analyze the dial information and acquires, for example, termination logical accommodation position information of a called extension and service information.

The call control section 9 instructs, based on the service information, the peripheral module control section 5 of the self node (private branch exchange PBX-A) of origination peripheral module (PM) control and termination peripheral module (PM) control with the origination and termination logical accommodation position information added thereto without being conscious of the node numbers of the origination and termination logical accommodation positions, and instructs the switch control section 7 of connection between the origination and termination logical accommodation positions.

The peripheral module control section 5 converts the logical accommodation position information into physical accommodation position information by means of the conversion section 31 thereof, performs origination control of the subscriber circuit 1 of the self node (private branch exchange PBX-A), and issues, for termination control, if it discriminates that the physical accommodation position is, for example, another node (private branch exchange PBX-B), a transfer request of termination peripheral module control information to the communication control section 6.

The communication control section 6 of the private branch exchange PBX-A transfers, in the fusion network of FIG. 2, the termination peripheral module control information to the communication control section 16 of the private branch exchange PBX-B through the local area network LAN1, fusion call control handling apparatus FCCH-a, digital trunk interface DTI-a, digital private line 115, digital trunk interface DTI-b, fusion call control handling apparatus FCCH-b and local area network LAN2. The communication control section 16 of the private branch exchange PBX-B distributes the termination peripheral module control information to the peripheral module control section 17 of the self node (private branch exchange PBX-B).

Thus, the peripheral module control section 17 of the private branch exchange PBX-B performs call control of the called extension of the subscriber circuit 15 of the private branch exchange PBX-B based on the instruction of the call control section 9 of the private branch exchange PBX-A.

Also the switch control section 7 of the private branch exchange PBX-A which is instructed of connection between the origination and termination logic accommodation positions similarly converts the logical accommodation position information into physical accommodation position information by means of the conversion section 31 thereof, and controls, if both of the call origination and termination physical accommodation positions are those of the self node, the channel switch TSW-a to effect connection between the communication and the switch. If one of the call origination and termination physical accommodation positions belongs to another node, for example, to the private branch exchange PBX-B, then the switch control section 7 transfers the connection instruction to the connection control section 8.

The connection control section 8 converts the logical accommodation position information into physical accommodation position information by means of the conversion section 31 thereof and selects, if the private branch exchanges PBX-A and PBX-B are to be connected to each other, a free trunk circuit between the private branch exchanges PBX-A and PBX-B and announces the logical accommodation position to the switch control section 7. Further, the connection control section 8 adds a connection number acquired from the local data memory LDM-a to the origination and termination accommodation position information and requests the communication control section 6 to transfer the control information to the connection control section 20 of the private branch exchange PBX-B.

The communication control section 6 of the private branch exchange PBX-A communicates with the communication control section 16 of the private branch exchange PBX-B similarly as described above to transfer the control information to the connection control section 20 of the private branch exchange PBX-B.

The connection control section 20 of the private branch exchange PBX-B converts the logical accommodation position information into physical accommodation position information by means of the conversion section 31 thereof, discriminates that the control information is a connection instruction to terminate in the self node, specifies the trunk from the connection number, and instructs the switch control section 19 of the private branch exchange PBX-B of connection to the termination accommodation position.

The switch control sections 7 and 19 of the private branch exchanges PBX-A and PBX-B control the channel switches TSW-a and TSW-b in response to the instructions of the connection control sections 8 and 20, respectively, to establish a call connection from the subscriber circuit 1 to the subscriber circuit 15 through the channel switch TSW-a, trunk circuit 3, trunk circuit 13 and channel switch TSW-b.

Further, the connection control section 8 of the private branch exchange PBX-A selects a trunk line, transmits control information to the connection control section 20 of the private branch exchange PBX-B to start connection control, and updates the event transfer destination node at the physical accommodation position of the originated call of the event transfer management memory of the self node (private branch exchange PBX-A) to the private branch exchange PBX-B.

Consequently, if, for example, while the private branch exchange PBX-B is calling the called person accommodated in the subscriber circuit 15, cancellation by the originating person of the subscriber circuit 1 is detected by the peripheral module scanning section 4 of the private branch exchange PBX-A, then this event is announced, by the peripheral module scanning section 4 which refers to the event transfer management memory, to the call control section 21 of the private branch exchange PBX-B through the communication control sections 6 and 16, and required processing is indicated by the call control section 21 (with the logical accommodation position information added without being conscious of the physical nodes similarly as in the call connection processing).

In this manner, the pertaining control sections of the pertaining nodes execute required processing without any competition of controls in response to an instruction of the call control section of a suitable node.

In particular, as in the operation of the fusion network described above, according to the fusion network construction based on distributed node switched network call control, by issuing, from the call control section of a suitable node, various call control instructions with logical accommodation position information of resources added thereto without being conscious of physical nodes to which the resources belong similarly as in a single private branch exchange, the pertaining resources of the pertaining nodes can be controlled in a centralized and fused condition.

Accordingly, in a fusion network based on distributed node switched network call control, a connected extension terminal can be applied without being conscious of in which node exchange it is accommodated. Further, an extension terminal connected to any node exchange can enjoy various equivalent additional services similarly to an extension terminal connected to a conventional single node private branch exchange.

The private branch mobile communication system according to the present invention shown in FIG. 1 is constructed such that, in such a fusion network construction based on distributed node switched network call control as described above, radio base stations are connected to individual nodes such that mobile communication as is provided by, for example, a personal handy phone system (PHS) for a place of business may be provided. Thus, in the following description, a personal handy phone system for a place of business is described as an example of the private branch mobile communication system.

Each of radio base stations (CS) accommodated in the private branch exchanges has the identification information (ID) sole (unique) in the fusion network which constructs the present system. This ID is composed of a PHS community number (PCN), a call area number (ERN) and a radio base station number (CSN). The PCN defines a range within which a SYS-ID which is a system call number over the fusion network is commonly used. This is because, while the common SYS-ID can be given to the private branch exchanges PBX in the fusion network, in such a case that the same network is used commonly by a plurality of tenants, a different SYS-ID is sometimes given to each tenant with a range of use thereof determined therefor. The ERN defines a range within which a broadcast termination call is to be provided to radio terminals (PS) in the PCN. The CSN is a serial number for specifying each individual radio base station (CS) in the ERN.

Figure 5:
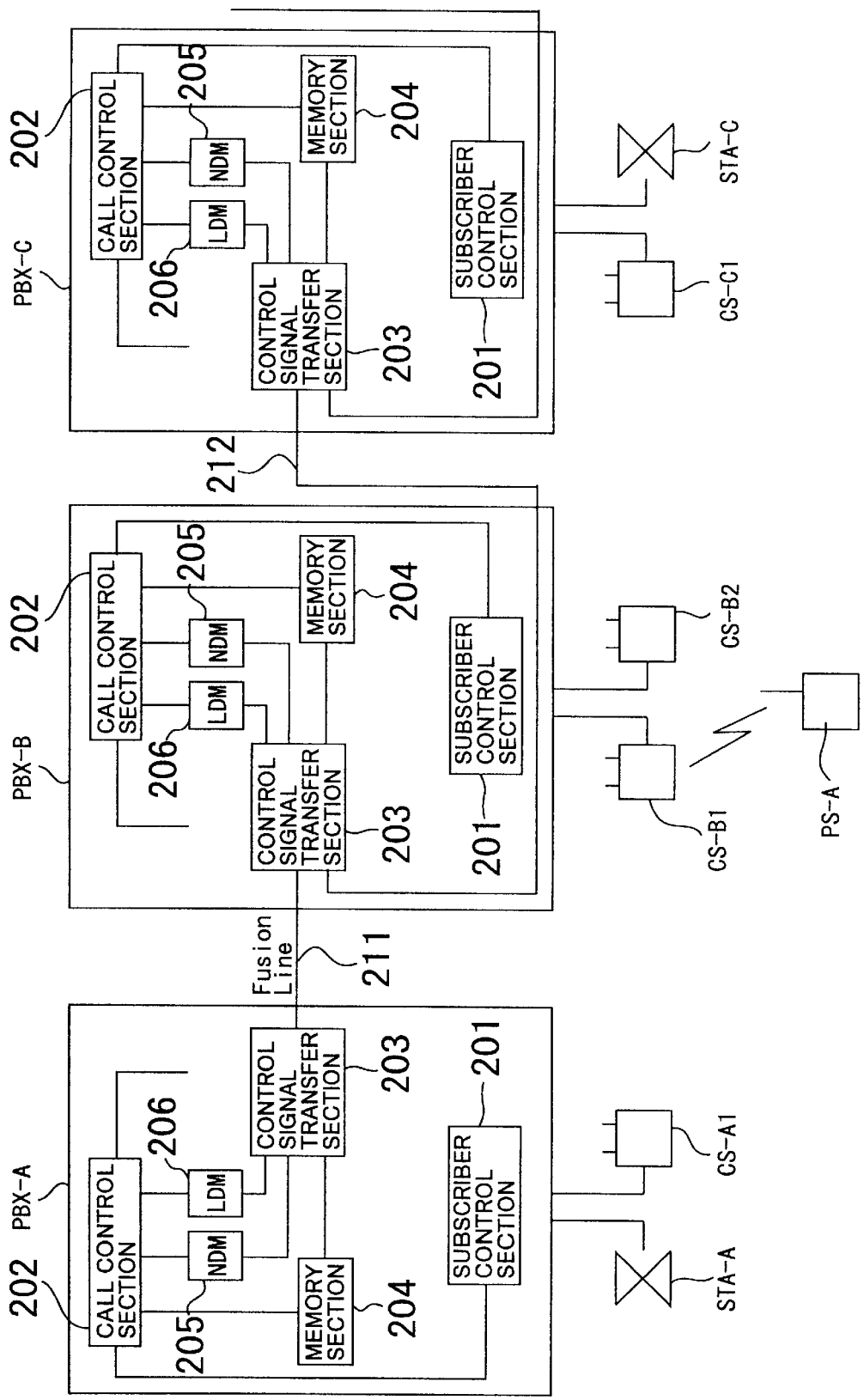
FIG. 5 is a block diagram showing an internal construction of a private branch exchange of the distributed node switched network of FIG. 2.

Each of the private branch exchanges PBX-A, PBX-B and PBX-C includes, as shown in FIG. 5 in which the construction shown in FIG. 3 is shown in a simplified manner, a subscriber control section 201, a call control section 202, a control signal transfer section 203, a memory section 204, a network common database (NDM) 205, and a local database (LDM) 206, and is constructed such that the call control section 202 in each private branch exchange can control the subscriber control sections 201 and so forth of the other nodes (private branch exchanges) through the fusion links.

The subscriber control section 201 controls communication with a radio base station (CS) which belongs to the self private branch exchange and performs fetching and forwarding of various events relating to call control and so forth.

The call control section 202 analyzes an event fetched by the subscriber control section 201 and forwards a control signal to the pertaining radio base station (CS). Further, the call control section 202 provides an instruction to read out or write to the memory section 204 while referring to a network common database (NDM) 205 and a local database (LDM) 206.

The control signal transfer section 203 transfers the control signal produced by the call control section 202 to the subscriber control section 201 of the pertaining private branch exchange. Further, the control signal transfer section 203 performs also transfer of data to the memory section 204 in response to an instruction of the call control section 202.

The memory section 204 stores position information of radio terminals (PS) and other necessary information. The local database (LDM) 206 stores accommodation position data of radio terminals (PS) and radio base stations (CS) of the private branch exchange PBX and other necessary information.

The network common database (NDM) 205 stores, as management information common to the network, mapping data between PHS community numbers (PCN) and the SYS-ID, radio base station accommodation position data mapped with the PCN, call areas and radio base station numbers (CSN), and data representing which private branch exchange is a home nodes to each radio terminal (PS) (an intra-home node identification ID and a node number for each unique ID in the network of the radio terminal).

The local database (LDM) 206 includes a database for managing data, for each radio terminal (PS) and each radio base station (CS), of position registration information (stored in the memory section 204) of the radio terminal (PS) corresponding to a unique ID in the network, the other party information and so forth, and another database for managing services (various services, transfer: call forwarding) and so forth. Registration into the databases is performed in advance using a maintenance terminal (not shown).

Each radio base station (CS) forwards, when it intends to start up itself, a startup request to the private branch exchange in which it is accommodated. The private branch exchange receiving the startup request determines a PCN from the accommodation position of the radio base station, reads out the SYS-ID from the PCN and writes the SYS-ID into the radio base station. Thereafter, the radio base station periodically announces the SYS-ID to radio terminals.

Each radio terminal (PS) has the SYS-ID written in advance therein and has a number (PS number) unique in the network allocated thereto so that also the node number of its home node can be distinguished based on its ID unique in the network corresponding to the number.

In FIG. 1, a radio terminal PS-A belongs to the private branch exchange PBX-A, and the private branch exchange PBX-A serves as a home node to the radio terminal PS-A. In the private branch exchange PBX-A, attribute information of the radio terminal PS-A and information regarding services are stored as a database as described hereinabove.

Since a construction wherein the SYS-ID which is used when each private branch exchange calls a radio terminal can be used commonly by a plurality of private branch exchanges as described above is provided, the radio terminal PS-A can move from the private branch exchange PBX-A of the home node to another private branch exchange while it is in a call termination waiting condition. In particular, even if the radio terminal PS-A moves to any physically different private branch exchange in the network while it is in a call termination waiting condition, it can originate or terminate a call in the radio area, and besides, it can utilize any service for the radio terminal PS-A provided by the private branch exchange PBX-A of the home node in whichever location it is.

Figure 6:
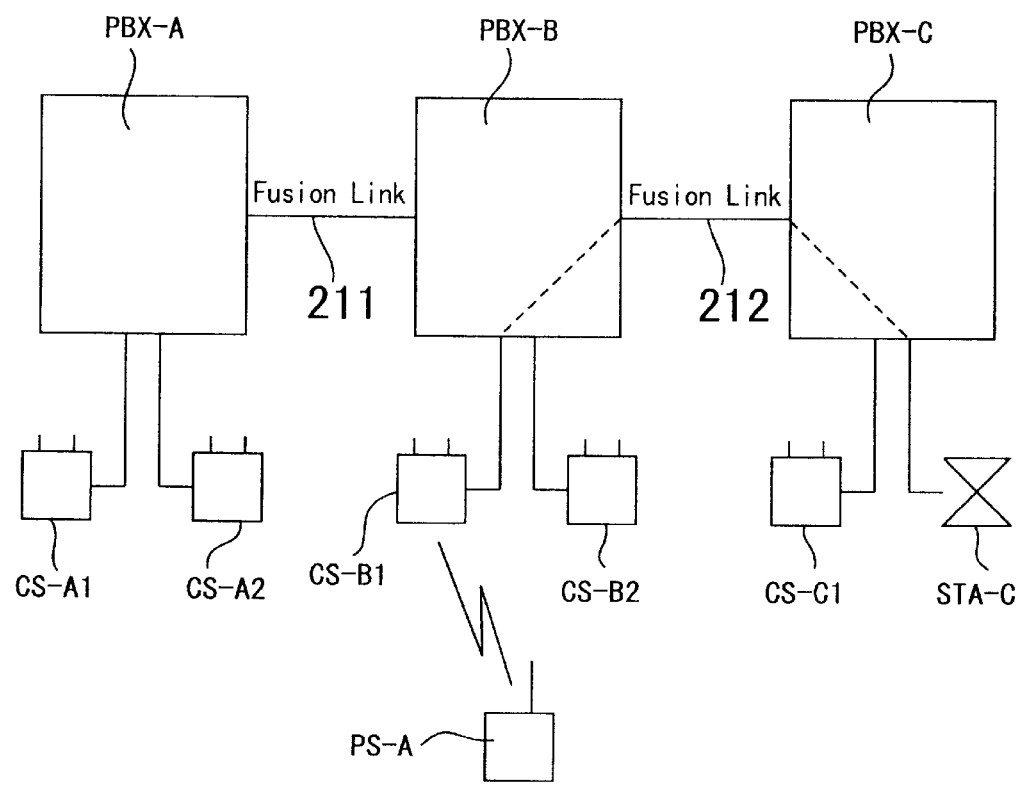
FIG. 6 is a view illustrating operation by the private branch mobile communication system.
Figure 8:
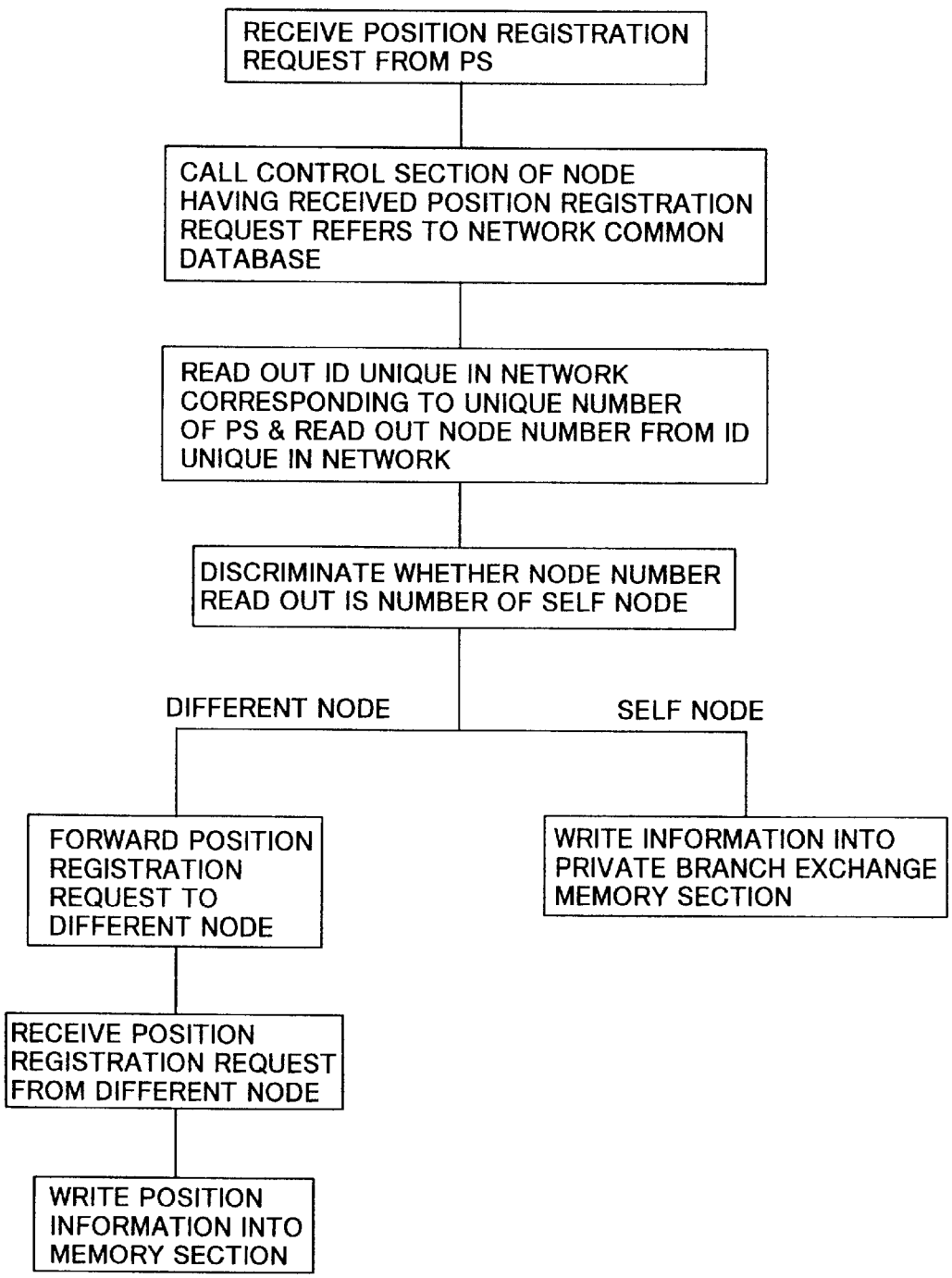
FIG. 8 is a flow chart illustrating position registration operation of a radio terminal by the private branch mobile communication system.

Now, an example of operation for position registration in a case wherein the radio terminal PS-A moves from the private branch exchange PBX-A to the private branch exchange PBX-B as shown in FIG. 6 is described. FIG. 8 is a flow chart of the same.

If a position registration event regarding the radio terminal PS-A is transmitted from a radio base station CS-B1 which belongs to the private branch exchange PBX-B to the subscriber control section 201 of the private branch exchange PBX-B, then the subscriber control section 201 announces to the call control section 202 that a position registration event has been received. At this time, since the radio terminal PS-A has issued a position registration request together with an ID allocated to the self machine and unique to the radio terminal (a unique ID with which the radio terminal can be specified in the network), also the unique ID of the radio terminal is announced to the call control section 202.

The call control section 202 can discriminate which private branch exchange is the home node to the radio terminal PS-A from which the position registration event has been issued by accessing the network common database NDM of the memory section 204 of the self private branch exchange PBX-B to convert the unique ID of the radio terminal PS-A into a node number and a physical accommodation position. The call control section 202 having discriminated the unique ID of the radio terminal PS-A transfers, in order to cause the position registration information regarding the radio terminal PS-A to be updated by the private branch exchange PBX-A which is the home node to the radio terminal PS-A, information of an instruction to rewrite the memory section 204 in the private branch exchange PBX-A to the control signal transfer section 203. The control signal transfer section 203 receiving the transferred instruction information transfers a control signal for instruction to update the position registration to the control signal transfer section 203 of the private branch exchange PBX-A over the fusion link 211. Thereupon, also the unique ID of the radio terminal PS-A is transferred simultaneously.

In the private branch exchange PBX-A receiving the control signal of the position registration updating instruction, the memory section 204 converts the received unique ID of the radio terminal PS-A into a node number and a physical accommodation position in response to an instruction of the call control section 202 to specify the radio terminal PS-A and updates the position registration information of the radio terminal PS-A in the memory section 204. An updating completion notification from the memory section 204 is transmitted to the call control section 202 of the private branch exchange PBX-B through the control signal transfer section 203 of the private branch exchange PBX-A and the control signal transfer section 203 of the private branch exchange PBX-B. The call control section 202 instructs the subscriber control section 201 to forward a position registration completion notification, and a message of success of position registration is transmitted from the subscriber control section 201 to the radio terminal PS-A through the radio base station CS-B1. If position registration has failed, then a message of failure is transmitted. Then, the unique ID of the radio terminal is transferred as information for allowing specification of the radio terminal also upon notification from the control signal transfer section 203 of the private branch exchange PBX-A to the call control section 202 of the private branch exchange PBX-B.

The radio terminal PS-A with which the position registration has been completed in such a manner as described above reads out service data from the local database (LDM)

206 of the private branch exchange PBX-B of the home node to the radio terminal PS-A itself to allow the radio terminal PS-A to enjoy services from the private branch exchange PBX-B.

Figure 9:
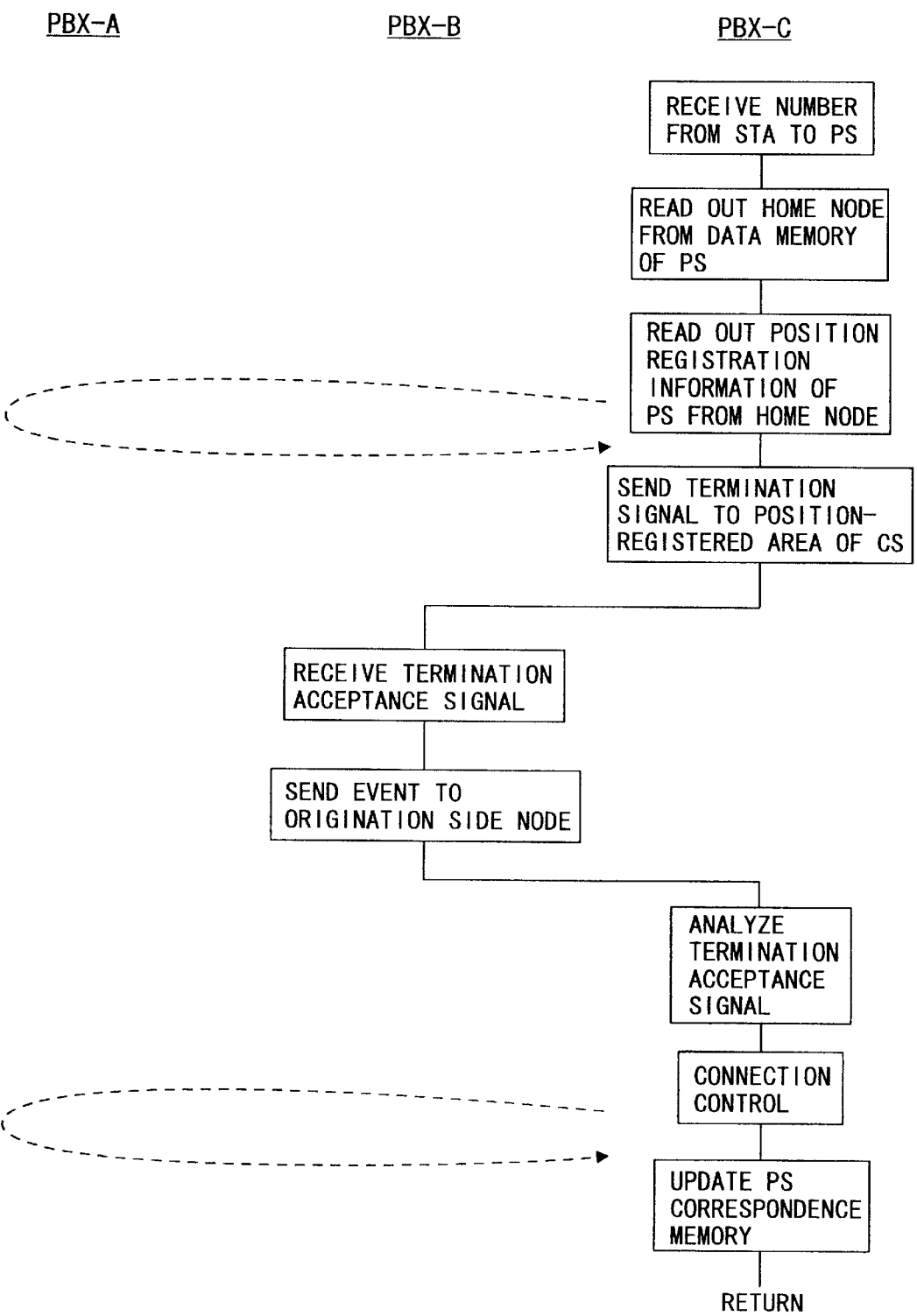
FIG. 9 is a flow chart operation by the private branch mobile communication system up to termination of a call when the call is originated from an extension terminal to a radio terminal.

Now, description is given of a case wherein a call to the radio terminal PS-A having moved to the private branch exchange PBX-B is originated from an extension terminal STA-C which belongs to the private branch exchange PBX-C in FIG. 6 is described. FIG. 9 is a flow chart of operation till termination of the call.

When the private branch exchange PBX-C receives the number of the radio terminal PS-A from the extension terminal STA-C, since it can discriminate which private branch exchange is the home node to the radio terminal PS-A (in this instance, the private branch exchange PBX-A), it forwards an inquiry to the private branch exchange PBX-A over the fusion links 211 and 212 and thus knows that the radio terminal PS-A has a position registration in the private branch exchange PBX-B at present. The private branch exchange PBX-C forwards a termination signal for the radio terminal PS-A to the radio base station CS-B1 or another radio base station CS-B2 which belongs to the private branch exchange PBX-B. In this instance, the radio terminal PS-A receives the termination signal from the radio base station CS-B1 whose radio wave is stronger, and transmits a termination acceptance signal to the radio base station CS-B1. The termination acceptance signal is sent to the private branch exchange PBX-C over the fusion link 212, and the private branch exchange PBX-C sets a path between the extension terminal STA-C and the radio base station CS-B1 of the private branch exchange PBX-B over the fusion link 212 to allow communication between the extension terminal STA-C and the radio terminal PS-A.

At this time, the private branch exchange PBX-B and the private branch exchange PBX-C can access the private branch exchange PBX-A of the home node to refer to the attribute information of the radio terminal PS-A and the information of the services, and the radio terminal PS-A can utilize services through the private branch exchange PBX-B or the private branch exchange PBX-C in the same conditions as those when it has a position registration in the private branch exchange PBX-A of the home node.

If the radio terminal PS-A tries to communicate with an extension terminal STA-A belonging to the private branch exchange PBX-A in FIG. 6, then the termination acceptance signal transmitted to the radio base station CS-B1 is sent to the private branch exchange PBX-A over the fusion link 211, and the private branch exchange PBX-B sets a path between the extension terminal STA-A and the radio base station CS-B1 over the fusion link 211 to allow communication between the extension terminal STA-A and the radio terminal PS-A.

<Other Embodiments of the Invention>

Figure 7:
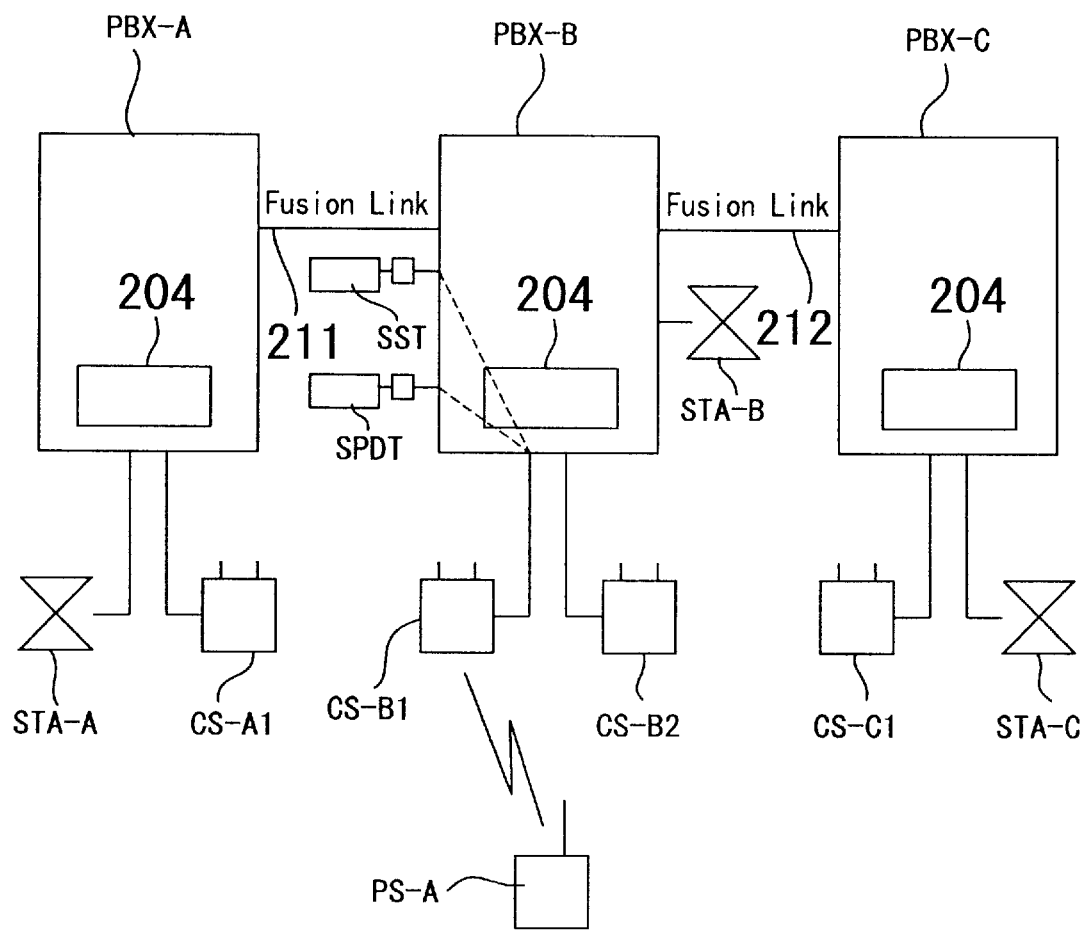
FIG. 7 is a view illustrating operation for busy transfer by the private branch mobile communication system.
Figure 10:
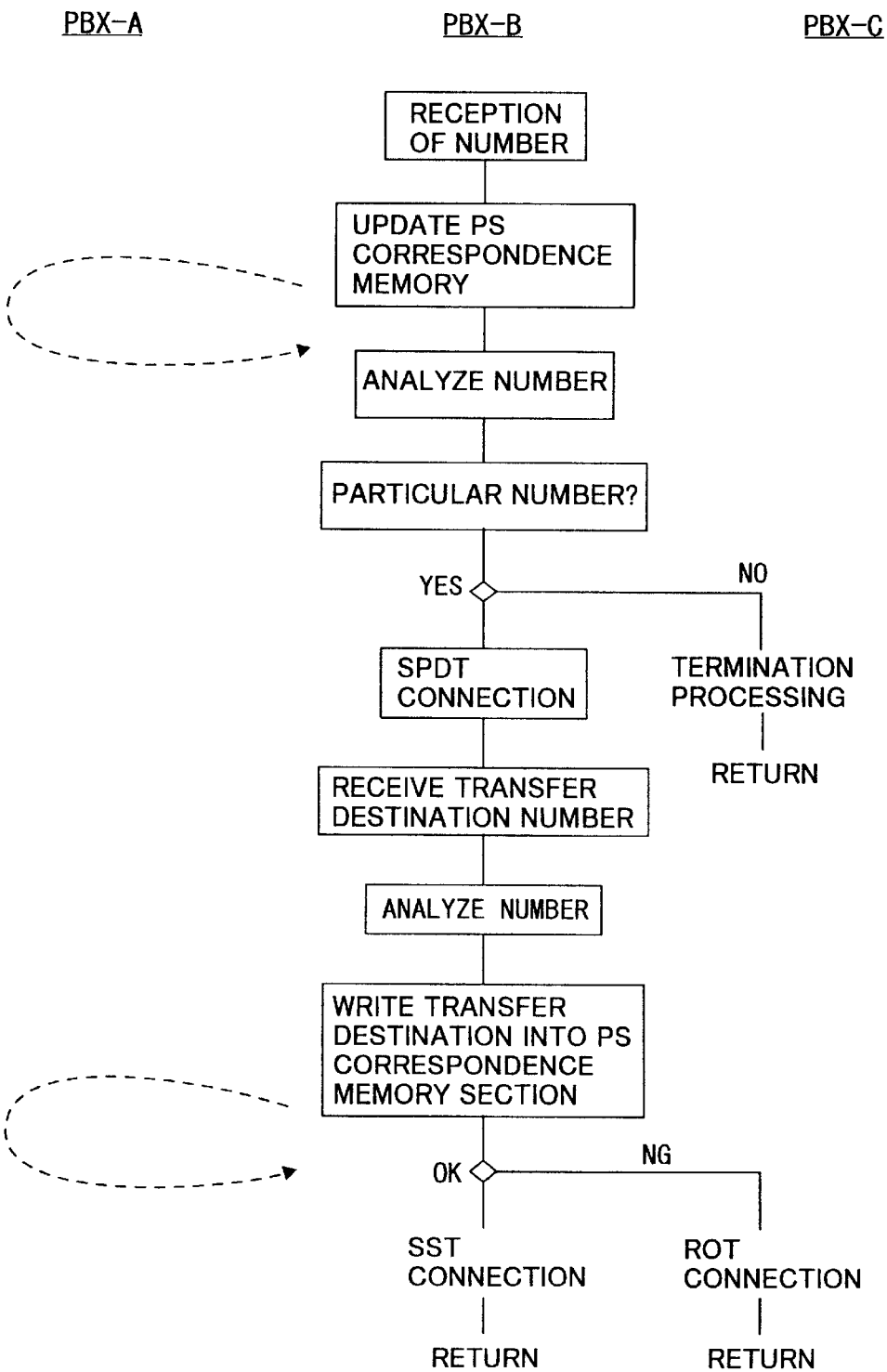
FIG. 10 is a flow chart illustrating busy transfer setting operation by the private branch mobile communication system.
Figure 11:
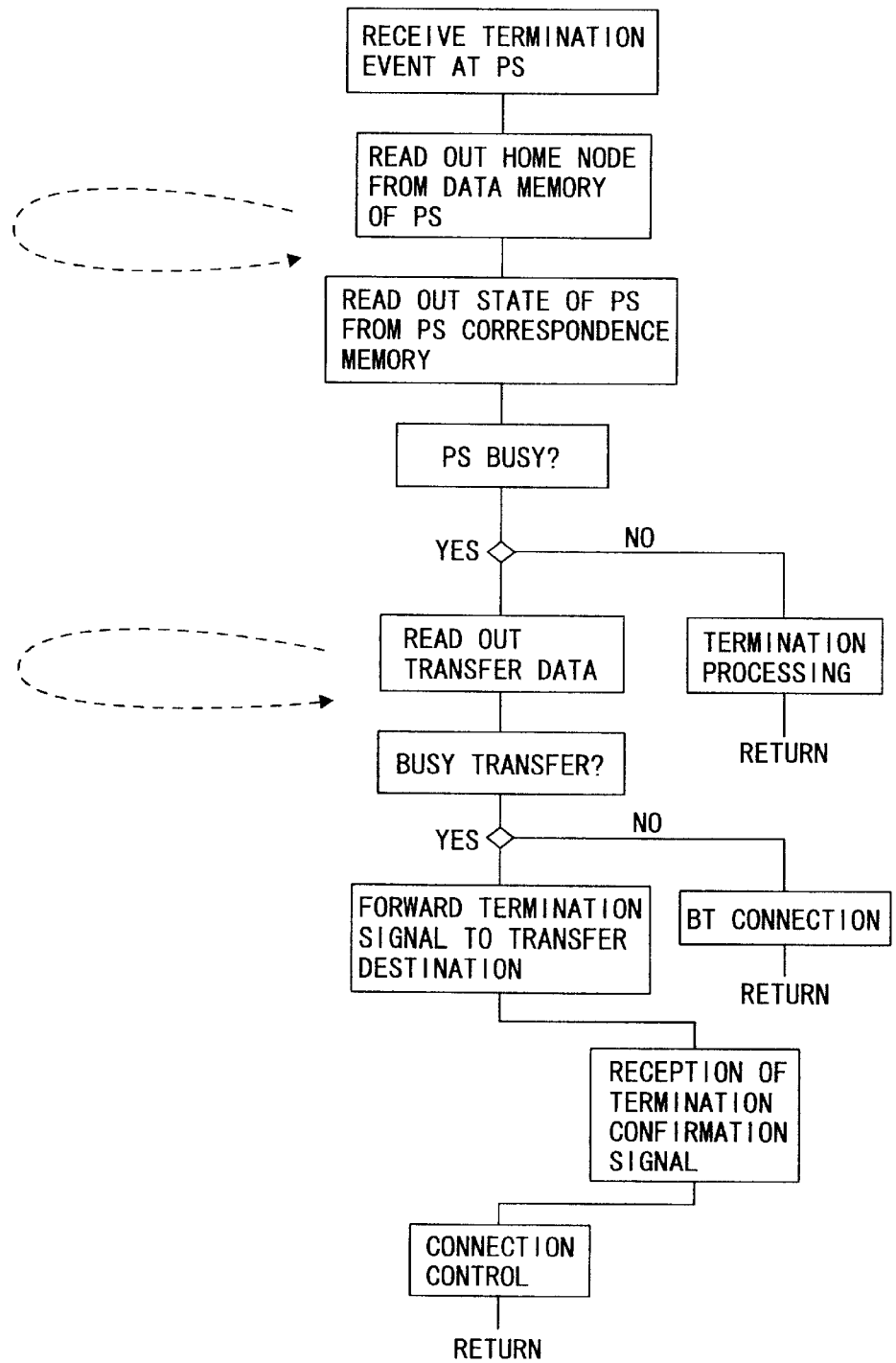
FIG. 11 is a flow chart illustrating busy transfer execution operation by the private branch mobile communication system.

FIG. 7 shows another private branch mobile communication system which performs busy transfer. FIG. 10 is a flow chart illustrating setting operation of busy transfer data of the private branch mobile communication system and FIG. 11 is a flow chart of execution of the busy transfer.

Setting of Busy Transfer Data

If, in the condition described above, the radio terminal PS-A originates a call from the radio base station CS-B1 and dials a particular number for busy transfer setting, then the number received by the subscriber control section 201 of the private branch exchange PBX-B is sent to the call control section 202, and the call control section 202 can request to refer to a database of number planning of the network common database (NDM) 205 and recognize from the data that the number is the particular number for busy transfer.

The call control section 202 of the private branch exchange PBX-B accesses the local database (LDM) 206 of the private branch exchange PBX-A through the control signal transfer section 203 of the private branch exchange PBX-B and the control signal transfer section 203 of the private branch exchange PBX-A to check whether or not busy transfer of the radio terminal PS-A has been set already. If busy transfer has been set already, then the call control section 202 of the private branch exchange PBX-B connects a trunk for restriction sound (ROT) and the B channel of the radio base station CS-B1 to each other so that restriction sound (ROT) is sent to the radio terminal PS-A. If busy transfer data has not been set as yet, then connection between the B channel of the radio base station CS-B1 and a tone (SPDT) for the special number are performed by the call control section 202 of the private branch exchange PBX-B so that the tone (SPDT) for the special number is sent to the radio terminal PS-A.

If, in this condition, the radio terminal PS-A dials the number of the extension terminal STA-C which is a destination of transfer, then the subscriber control section 201 of the private branch exchange PBX-B receives the number and transfers it to the call control section 202. The call control section 202 accesses, based on the number, the local database (LDM) 206 or the network common database (NDM) 205 of the private branch exchange PBX-A through the control signal transfer section 203 of the private branch exchange PBX-B and the control signal transfer section 203 of the private branch exchange PBX-A and writes the information of the destination of busy transfer into the memory section 204. The memory section 204 announces a write completion notification to the call control section 202 of the private branch exchange PBX-B through the control signal transfer section 203 of the private branch exchange PBX-A and the control signal transfer section 203 of the private branch exchange PBX-B. The call control section 202 receiving the write completion notification connects a trunk for service set tone (SST) and the B channel of the radio base station CS-B1 to each other so that the set tone (SST) is transmitted to the radio terminal PS-A.

Execution of Busy Transfer

It is assumed that the radio terminal PS-A and the extension terminal STA-A are communicating with each other in the condition described above. At this time, if an extension terminal STA-B calls the radio terminal PS-A, then the call control section 21 of the private branch exchange PBX-B accesses the memory section 204 of the private branch exchange PBX-A through the control signal transfer section 203 of the private branch exchange PBX-B and the control signal transfer section 203 of the private branch exchange PBX-A to read out the basic database of the radio terminal PS-A and consequently knows that the radio terminal PS-A is busy. The call control section 21 of the private branch exchange PBX-B performs reading out of whether or not busy transfer is set already in the service database of the radio terminal PS-A now in the memory section 204 again through the control signal transfer section 203 of the private branch exchange PBX-B and the control signal transfer section 203 of the private branch exchange PBX-A again. As a result, if busy transfer is not set, then the call control section 202 of the private branch exchange PBX-B connects the extension terminal STA-B and a trunk for busy tone (BT) to each other so that busy tone is transmitted to the extension terminal STA-B.

In this instance, since busy transfer is set, the call control section 202 of the private branch exchange PBX-B recognizes that the destination of transfer is the extension terminal STA-C. Thus, the call control section 202 of the private branch exchange PBX-B instructs the call control section 202 of the private branch exchange PBX-C to call the extension terminal STA-C through the control signal transfer section 203 of the private branch exchange PBX-B and the control signal transfer section 203 of the private branch exchange PBX-A. The call control section 202 of the private branch exchange PBX-C confirms that the extension terminal STA-C is free, and calls the extension terminal STA-C. If the extension terminal STA-C responds to the call, then the call control section 202 of the private branch exchange PBX-C sets a communication path to the fusion link 212 so that the radio terminal PS-A and the extension terminal STA-C enter a communication condition with each other, resulting in success of busy transfer.

As described above, a private branch mobile communication system according to the present invention includes a database provided in each of private branch exchanges which form a local area switched network over a wide area for storing information common to the network, each of radio terminals which belongs to the individual private branch exchanges being provided with an ID unique in the network as a logical number, and means for converting the unique ID of any radio terminal into a node number (identification number of each private branch exchange) and a physical accommodation position (imaginary accommodation position or physical extension number) provided by the home private branch exchange to the radio terminal. Consequently, since the radio terminals can be managed in a centralized fashion in the network to whichever home private branch exchanges they belong, a SYS-ID, which has conventionally been provided to each private branch exchange, can be possessed commonly by the network. Therefore, use of a radio terminal in a radio area belonging to another different private branch exchange, which has conventionally been able to be performed only by PBX roaming, is substantially same as use in a home radio area.

While preferred embodiments of the present invention have been described using specific terms, such description is for illustrative purposes only, and it is to be understood that changes and variations may be made without departing from the spirit or scope of the following claims.

What is claimed is:

1. A private branch mobile communication system, comprising:

a distributed node switched network including a plurality of private branch exchanges each of which accommodates one or more radio base stations and has an identifiable node number provided thereto, and one or more radio terminals;

a common system ID which defines a range of use over said distributed node switched network being allocated to said radio terminals, private branch exchanges and radio base stations;

a network common database provided in each of said private branch exchanges and common for said radio terminals which have the system ID and the radio base stations, and a local database provided in each of said private branch exchanges for recording basic data of any of said radio terminals and said radio base stations into the private branch exchange so that the private branch exchange may serve as a home node to the radio terminal; and means provided in each of said private branch exchanges for referring to said network common database to convert an ID from a radio terminal into a node number and a physical accommodation position provided by the private branch exchange of the home node to the radio terminal.

2. A private branch mobile communication system as claimed in claim 1, further comprising:

a subscriber control section provided in each of said private branch exchanges for controlling communication with any of said radio base stations which belongs to the private branch exchange and performing fetching and forwarding of various events;

a call control section provided in each of said private branch exchanges for discriminating which one of said private branch exchanges serves as a home node to that one of said radio terminals which has forwarded a position registration event by accessing said network common database of the private branch exchange itself and converting a unique ID of the radio terminal into a node number and a physical accommodation position;

a memory section provided in each of said private branch exchanges for storing position information of radio terminals and other related information; and a control signal transfer section provided in each of said private branch exchanges for transferring a control signal for rewriting said memory section of the private branch exchange of the home node in response to an instruction of said call control section.

3. A private branch mobile communication system as claimed in claim 1, wherein said private branch mobile communication system forms a personal handyphone system.

4. A private branch mobile communication system as claimed in claim 2, wherein said private branch mobile communication system forms a personal handyphone system.

5. A private branch mobile communication system as claimed in claim 1, wherein said means for referring to said network common database comprises:

a receiving unit that receives information corresponding to a logical accommodation position of said radio terminal; and a conversion section that refers to said network common database so as to convert said logical accommodation position to said node number and to a channel switch accommodation position.

6. A private branch mobile communication method, comprising the steps of:

forming a distributed node switched network from a plurality of private branch exchanges each of which accommodates one or more radio base stations and has an identifiable node number provided thereto, and one or more radio terminals;

allocating a common system ID which defines a range of use over said distributed node switched network to said radio terminals, private branch exchanges and radio base stations;

storing, into each of said private branch exchanges, a network common database common for the radio terminals which have the system ID and a local database for recording basic data of any of said radio terminals into the private branch exchange so that the private branch exchange may serve as a home node to the radio terminal and radio base stations;

determining, when any of said radio terminals which has the common system ID forwards a position registration request to one of said radio base stations which belongs to one of said private branch exchanges other than the home node to the radio terminal itself, by the private branch exchange to which the position registration request has been forwarded, an ID unique in the network of the radio terminal from said network common database and communicating, based on the ID unique in the network determined from the network common database and the node number, the position registration request of the radio terminal to the private branch exchange of the home node designated by the node number; and updating, by the private branch exchange of the home node, the position registration information of the memory section regarding the radio terminal.

7. A private branch mobile communication method as claimed in claim 6, wherein, when the radio terminal performs a busy transfer request, data for busy transfer is read out from the memory section of the private exchange of the home node to the radio terminal, and a communication path is established between the radio terminal and an extension terminal of a destination of the transfer through the private branch exchanges.

8. A private branch mobile communication method, comprising the steps of:

forming a distributed node switched network from a plurality of private branch exchanges each of which accommodates one or more radio base stations, and one or more radio terminals;

allocating a common system ID which defines a range of use over said distributed node switched network to said radio terminals, private branch exchanges and radio base stations;

storing, into each of said private branch exchanges, a network common database common for the radio terminals which have the system ID and a local database for recording basic data of any of said radio terminals into the private branch exchange so that the private branch exchange may serve as a home node to the radio terminal; and referring, when any of said radio terminals which has the common system ID performs a position registration event into one of said radio base stations which belongs to a second one of said private branch exchanges other than the home node to the radio terminal, by the second private branch exchange, to said network common database to access the memory section of the private branch exchange of the home node to perform position registration and reading out service data regarding the radio terminal stored in the private branch exchange individual data base of the home node, and then performing an additional service by the second private branch exchange.

* * * * *